United States Patent [19]
Sachs et al.

[11] Patent Number: 5,528,731
[45] Date of Patent: Jun. 18, 1996

[54] METHOD OF ACCOMMODATING FOR CARBON/ELECTRET TELEPHONE SET VARIABILITY IN AUTOMATIC SPEAKER VERIFICATION

[75] Inventors: Richard M. Sachs, Middletown; Max S. Schoeffler, Old Bridge, both of N.J.

[73] Assignee: AT&T Corp., Murray Hill, N.J.

[21] Appl. No.: 155,973

[22] Filed: Nov. 19, 1993

[51] Int. Cl.⁶ .................................................. G01L 5/06
[52] U.S. Cl. ........................................ 395/2.55; 395/2.42
[58] Field of Search .................................. 395/2.42, 2.55; 381/103, 98

[56] References Cited

U.S. PATENT DOCUMENTS

| | | | |
|---|---|---|---|
| 4,631,749 | 12/1986 | Rapaich | 381/56 |
| 5,185,848 | 2/1993 | Anitsuka et al. | 395/2 |
| 5,201,004 | 4/1993 | Fujiwara et al. | 381/46 |
| 5,206,913 | 4/1993 | Sims | 381/103 |

Primary Examiner—Allen R. MacDonald
Assistant Examiner—Thomas J. Onka
Attorney, Agent, or Firm—Ronald D. Slusky; Michele L. Conover; Jeffrey M. Weinick

[57] ABSTRACT

In a speaker verification system, a method of compensating for differences in speech samples obtained during registration and those obtained during verification due to the use of different types of microphones is provided by filtering at least one of the samples such that the similarities of the two samples are increased. The filtered sample is used within the speaker verification matching process. A two-way comparison is disclosed in which both a verification speech sample and a reference sample are filtered with nonlinear microphone characteristics such as carbon microphone characteristics. A four-way comparison is also disclosed in which patterns produced from unfiltered verification and reference samples and patterns produced from the filtered verification and reference samples are compared to identify a match. A score is determined for each comparison. The comparison having the best score is used to determine if a match has occurred.

11 Claims, 5 Drawing Sheets

| REFERENCE PATTERN | VERIFICATION PATTERN | CLOSEST MATCH WHEN MICROPHONES ARE: |
|---|---|---|
| FILTERED | UNFILTERED | REFERENCE: ELECTRET<br>VERIFICATION: CARBON |
| UNFILTERED | FILTERED | REFERENCE: CARBON<br>VERIFICATION: ELECTRET |
| UNFILTERED | UNFILTERED | BOTH CARBON OR<br>BOTH ELECTRET |
| FILTERED | FILTERED | BOTH CARBON OR<br>BOTH ELECTRET |

METHOD OF ACCOMMODATING FOR CARBON/ELECTRET TELEPHONE SET VARIABILITY IN AUTOMATIC SPEAKER VERIFICATION

BACKGROUND OF THE INVENTION

The present invention is generally directed to speaker verification, and more particularly, to a method of accommodating variability among different types of telephone handsets, in order to improve the accuracy of speaker verification.

Speaker Verification (SV) is a speaker-dependent pattern-matching process in which a subscriber's speech sample presented for verification is processed to produce a verification pattern. This verification pattern is compared to an SV reference pattern that is typically produced from speech samples previously provided in the course of a so-called registration session. A "match" between the verification and reference patterns occurs when their characteristics are substantially similar. Otherwise, a "mismatch" is said to have occurred.

A typical application of SV is a telephony-based security system. A subscriber "registers" with the system by providing speech samples over a telephone link and an SV reference pattern is produced. Subsequently, a caller, seeking access to, for example, a service or some secure data, calls the system and presents his/her speech sample for verification as described above. If a match occurs, the desired access is granted. If there is a mismatch, it is presumed that a so-called imposter—pretending to be a subscriber—was the caller and access is denied.

Many times, SV is complicated by the fact that the verification pattern is different from the SV reference pattern due to circumstances such as, illustratively, the use of different types of telephone handset microphones, e.g., linear (such as electret) and non-linear (such as carbon). Other examples include different background noises and different speaking levels. These differences can cause characteristics of the speech sample provided during registration and the speech sample provided during any particular SV verification session to be different from one another. The corresponding patterns will then also be different, possibly resulting in an incorrect "mismatch" determination.

In particular, an electret microphone performs a fairly linear transformation on incoming speech samples and, as such, minimally distorts them. A carbon microphone, on the other hand, performs a non-linear transformation on the speech samples by, for example, compressing high-volume speech levels and suppressing low background noise levels, the latter often being referred to in the art as "enhancement." As such, the carbon microphone distorts the speech samples to a significant extent. Because of the variability in the effects that these different types of microphones have on the samples, it is difficult to discriminate between a mismatch caused by using different types of microphones and a mismatch caused by comparing an SV reference pattern to a verification pattern generated from a speech sample provided by an imposter.

Thus, a subscriber who registers using one type of telephone handset microphone and attempts to be "verified" using another type of handset microphone is more likely to be denied access than one who registers and attempts to be verified using the same type of handset microphone.

SUMMARY OF THE INVENTION

In accordance with the present invention, the problem of compensating for variability in speech samples due to the use of different types of microphones is solved by filtering at least one of the samples in accordance with the characteristics of one of the microphone types and using the filtered sample within the matching process.

In general, it is not possible to determine whether any particular speech sample originated from any particular type of microphone. Therefore, in preferred embodiments, both the verification speech sample and the SV reference sample are filtered with typical carbon-microphone characteristics. Consequently, any variability which may have resulted from using different types of handset microphones is reduced. Variability originating from other properties of the speech sample such as added background noise, and telephone network distortion or variable speaking level is also reduced. For example, if the samples are generated by an electret microphone, the filtering causes the samples to have similar characteristics to samples that would have been generated by a carbon microphone. If the samples are generated by a carbon microphone, the filtering will result in samples which, although now different, retain their essential character as carbon microphone speech samples. Thus, no matter which type of microphone was used to provide the two samples, their filtered versions both have carbon-microphone-like characteristics.

The principal consequence of the foregoing is that because the invention reduces the variability between samples provided using different microphone types, that variability need not be taken into account when establishing criteria under which a "match" will occur. Indeed, the invention allows those criteria to be made more stringent while not increasing the level of incorrect rejection (the latter being the declaration of a mismatch when the caller is, in fact, the subscriber).

In an alterative embodiment of the invention, patterns produced from unfiltered versions of the verification and reference samples are used along with the patterns produced from the filtered versions of the verification and reference samples as described above. Comparisons are made between each version of the verification pattern and each version of the reference pattern. The results are then used to determine whether a match has occurred. This approach could, in theory, improve the overall system performance, for reasons that are explained in detail hereinbelow.

Variability in the patterns can arise from factors other than differences in microphone type. For example, background noise derived acoustically or from telephone-network-based circuitry may introduce variability into the patterns. Other factors such as variable speaking level or variability arising from other properties of the utterance not related to speaker differences may also introduce variability which may result in a mismatch determination.

Indeed, the principles of the invention can be used to address such other variabilities. In particular, the invention generally encompasses the concept of processing at least one of the recognition and verification speech samples so that the properties characterizing the processed speech sample are more similar to the properties of the other speech sample than is the unprocessed speech sample. The processing could thus be noise-reduction processing or volume-normalization processing, or whatever processing is available to make the recognition and verification patterns of the same subscriber are closer to one another.

DETAILED DESCRIPTION

Figure 1:
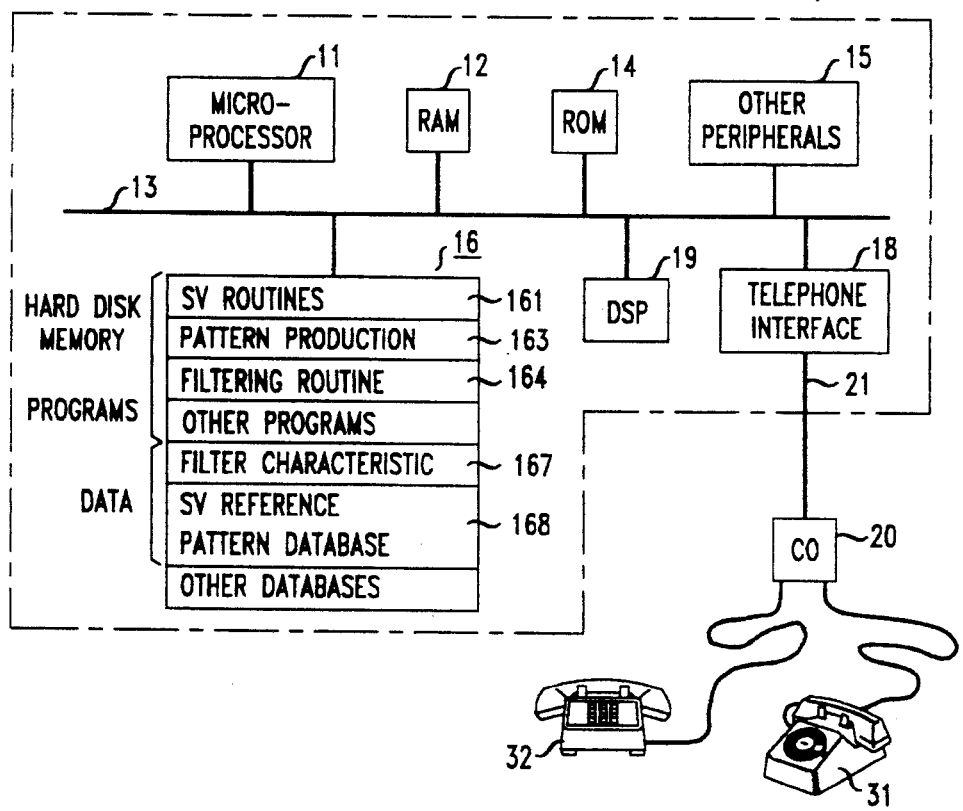
FIG. 1 illustrates a block diagram of a computer system service platform in accordance with the present invention.

FIG. 1 shows a computer system service platform 10 which implements the principles of the present invention. At the heart of service platform 10 is a microprocessor 11 and various standard peripherals with which it communicates over bus 13. The peripherals include random access memory (RAM) 12, read-only memory 14, hard disk memory 16, telephone interface 18, digital signal processor (DSP) 19 and a number of other peripherals indicated at 15. (Although not shown in the FIG., DSP 19 may have its own memory elements and/or a direct connection to various memory elements within the system, such as disk memory 16.)

Service platform 10 is accessible only by subscribing individuals referred to herein as "subscribers." The process of becoming a subscriber includes a "registration" process wherein the subscriber is asked to recite utterances which are converted into reference speech samples. This is illustratively carried out during a telephone call made to the system from rotatory telephone set 31 via telephone central office (CO) 20 and a telephone line 21 extending from CO 20 to telephone interface 18. Those reference speech samples are used to produce a speaker verification (SV) reference pattern for each registered subscriber, those patterns being stored in a data section of disk memory 16, and indicated as database 168. The routines which produce the reference pattern from the speech samples are pattern production routines 163.

Assume, now, that at a later time the subscriber is connected to service platform 10 from rotary telephone 31, or from touch-tone telephone 32 also connected to CO 20 or, indeed, from any other telephone connected to any other central office. Once the call has been answered by the service platform 10, a process of verifying the subscriber is initiated. That process, which is embedded in SV routine 161, prompts the call for a subscriber identification number, which may be entered either via touch-tone entry or speaker-independent digit recognition. This enables the platform to retrieve the stored reference pattern for the subscriber in question. The subscriber is prompted to recite a desired utterance. As was the case during registration, the recited utterance is converted to a set of speech samples from which a verification pattern is produced again using pattern production routine 163. If a comparison of the two patterns indicates that the caller is, indeed, the subscriber, the caller is granted access to the service platform 10. The service platform 10 may, for example, serve as a source of information to which only subscribers have access. Voice mail is a typical example. Or, the platform may be a gateway to an outbound calling service, or may be a resource used by another service wanting to verify a person's identity.

Many times, SV is complicated by the fact that the verification pattern is different from the SV reference pattern due to circumstances such as, illustratively, the use of different types of telephone handset microphones. In the present illustrative embodiment, for example, rotary telephone 31 has a non-linear, carbon microphone while touch-tone telephone 32 has a linear, electret microphone. These differences can cause characteristics of the speech sample provided during registration and the speech sample provided during any particular SV verification session to be different from one another. The corresponding patterns will then also be different, resulting in an incorrect "mismatch" determination.

Variability in the patterns can arise from other factors as well. Background noise derived acoustically or from telephone-network-based circuitry may introduce variability into the patterns. Other factors such as variable speaking level or variability arising from other properties of the utterance unrelated to the carter's identity may also introduce variability which may result in a mismatch determination.

Figure 2:
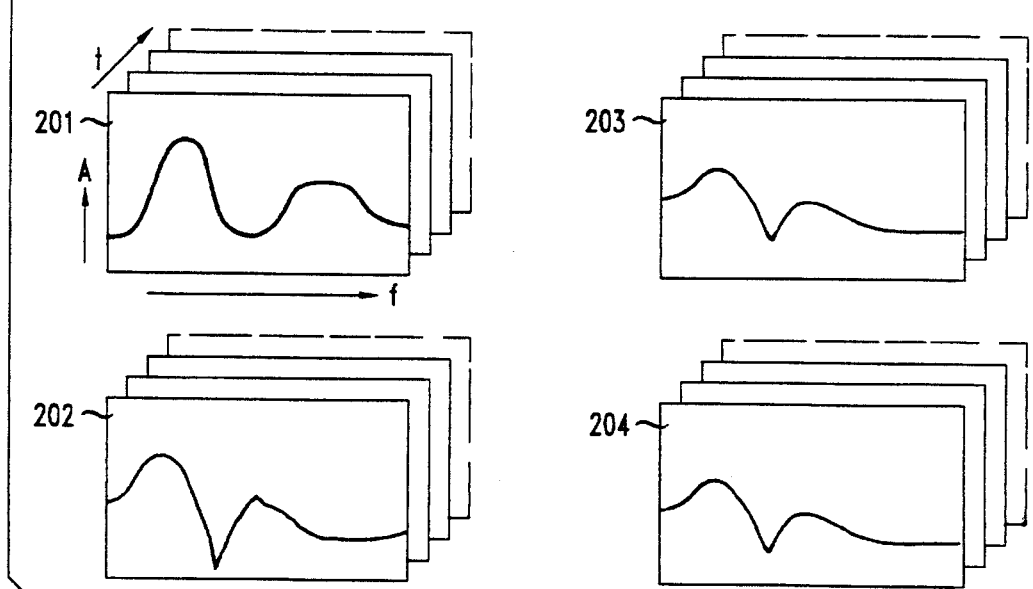
FIG. 2 illustrates three dimensional representations of a reference pattern and verification pattern generated by an electret microphone and a carbon microphone filtered with carbon-microphone characteristics.

These problems can be more fully appreciated by a consideration of FIG. 2. This FIG. shows representations of a reference pattern 201 produced from an electret-microphone-originated utterance spoken by a particular subscriber and a verification pattern 202 produced when that same subscriber spoke the same utterance but from a telephone having a carbon microphone. As is well known in the art, and as depicted in the FIG., these patterns can be thought of as a time sequence of feature vectors, only one of which is depicted explicitly for each pattern. Note that the patterns are different, resulting from the different characteristics of the two microphone types. These differences in the patterns may result in an SV mismatch. In the prior art, to achieve a particular desired level of verification acceptance, the criteria by which a match is determined must be sufficiently relaxed to compensate for this phenomenon. Disadvantageously, however, such relaxation will make it easier for an imposter to gain access.

The present invention alleviates this problem. In particular, the variability in speech samples due to the use of different types of microphones is dealt with by filtering at least one of the samples in accordance with the characteristic of one of the microphone types and using the filtered sample within the matching process. However, the general methods described below could also be used to reduce other types of variability which may arise from certain properties of the speech samples. A routine which carries out this type of filtering is denoted in FIG. 1 at 164, with the data defining the filter characteristic being denoted at 167.

Thus as further shown in FIG. 2, the electret-originated pattern 201, is filtered in accordance with a carbon microphone characteristic, resulting in a carbon-filtered pattern 203 which is closer in similarity to pattern 202 than is pattern 201. It is therefore possible to make the acceptance criteria more stringent than before without increasing the level of incorrect rejections. Use of the more stringent criteria, moreover, means an enhanced ability to reject imposters.

In general, it is not possible to determine whether any particular speech sample originated from any particular type of microphone. Therefore, in preferred embodiments, both the verification speech sample and the SV reference sample are filtered. Consequently, any variability which may have resulted from using different types of handset microphones is reduced. For example, if the samples are generated by an electret microphone, the filtering causes the samples to have similar characteristics to samples that would have been generated by a carbon microphone. This was just described in connection with patterns 201,202 and 203. If the samples are generated by a carbon microphone, the filtering will result in samples which, although now different, retain their essential character as carbon microphone speech samples. This is illustrated by pattern 204, which is the pattern that results by filtering pattern 202 with the carbon-microphone characteristic. Thus no matter which type of microphone was used to provide the reference and verification samples, their filtered versions both have carbon-microphone-like characteristics. Advantageously, this directly enables the platform 10 to make the criteria for matching more stringent, as noted above.

Figures 3, 4:
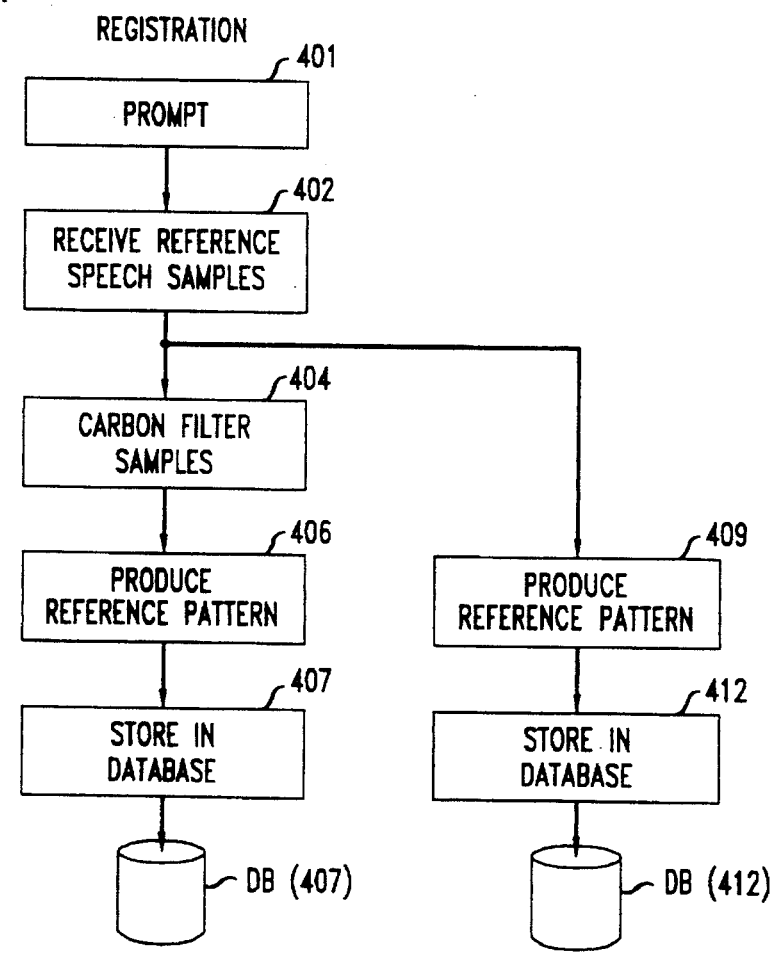
FIG. 3 illustrates a table representing the conditions in which a closest match will occur as a function of the reference pattern and verification pattern.
FIG. 4 illustrates a flow chart depicting a method of registering a reference speech sample.
Figure 5:
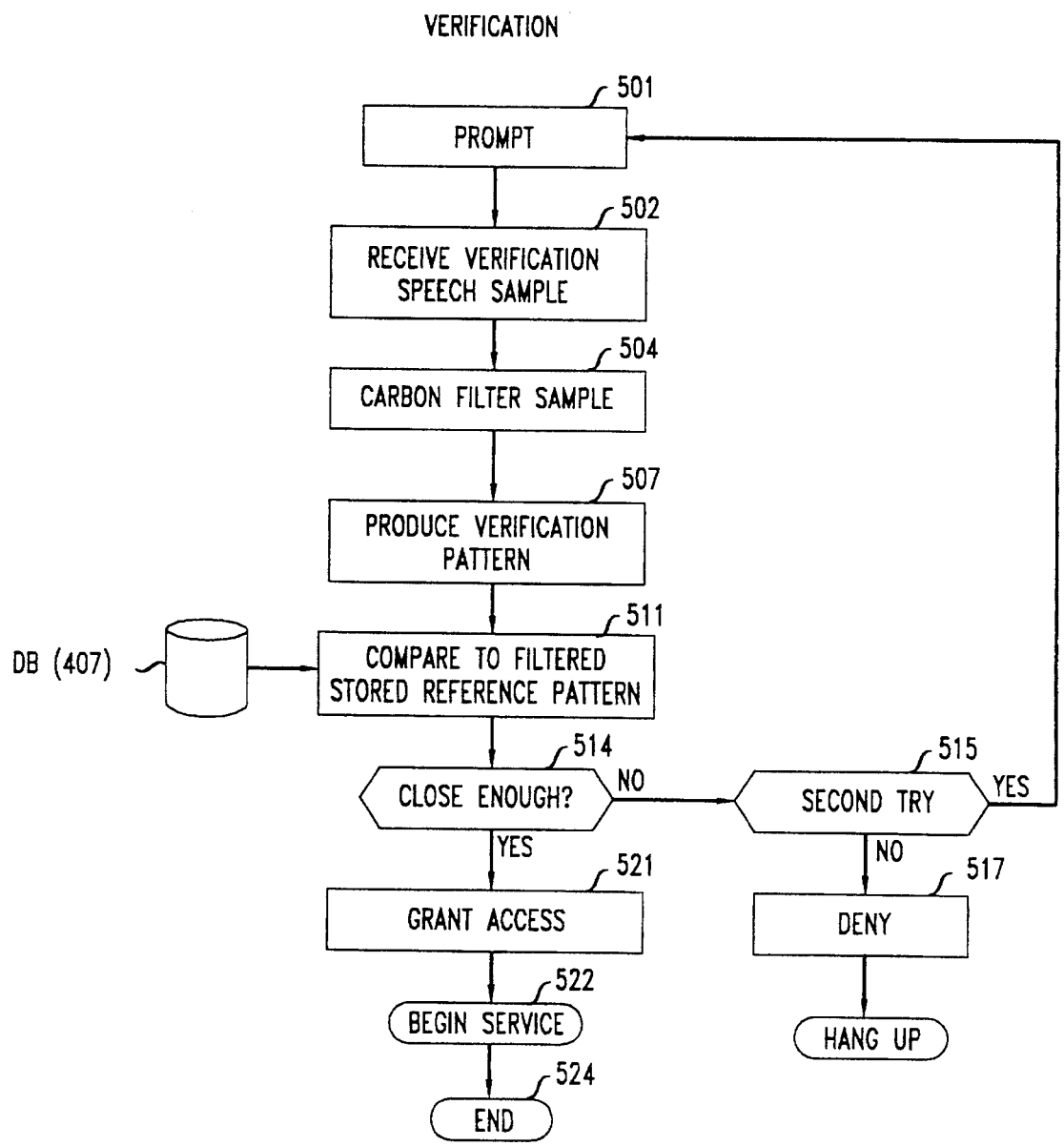
FIG. 5 illustrates a flow chart depicting a method of verifying a verification speech sample using a one-way comparison in accordance with the present invention.

The overall process as just described is represented by the flowcharts of FIGS. 4 and 5. FIG. 4, in particular, represents the registration process. As indicated at 401, the subscriber is prompted to recite the utterance. Reference speech samples are generated from the received utterances (402). Those samples are carbon-filtered in accordance with the invention (404), the reference pattern is produced (406), and stored (407) in a portion of database 168. As shown in FIG. 4, that portion of the database is referred to as DB(407).

FIG. 5 represents the verification process which, for reasons that will become apparent, is referred to as the one-comparison process. A verification pattern is produced in steps 501, 502, 504 and 507 which parallel steps 401, 402, 404 and 406, respectively, in FIG. 4. (Although not explicitly shown, the prompting step 501 includes prompting the caller for the above-mentioned identification number.) In step 511, the verification pattern produced in step 507 is compared to the reference pattern retrieved from DB(407) (based on the subscriber identification number). If, at step 514, the two patterns are "close enough" to one another—based on well-known speech verification methods—access to the service provided by the platform is granted (521), service begins (522), and the process ends (524).

If, on the other hand, the two patterns are not "close enough" to one another, and if this is not the caller's second attempt to gain access during this call, as determined at 515, the process returns to step 501, thereby giving the caller a "second try." If it is the caller's second attempt, access is denied (517) and the platform terminates the call (hangs up). It is possible that the caller is, in fact, the subscriber but for any of a number of reasons was denied access anyway. Accordingly, an alternative to terminating the call is to transfer it to a live operator who can verify the caller's identity using information as might be available such as the caller's mother's maiden name.

In an alterative embodiment of the invention, patterns are produced from unfiltered versions of the verification and reference samples and used along with the patterns produced from the filtered versions as described above. The unfiltered patterns are stored (412) in a portion of database 168 denoted by DB(412). As indicated above in steps 401,402, 404,406 and 407, the subscriber is prompted to recite an utterance from which a filtered version of a reference pattern is ultimately produced and stored in database DB(407).

Figure 6:
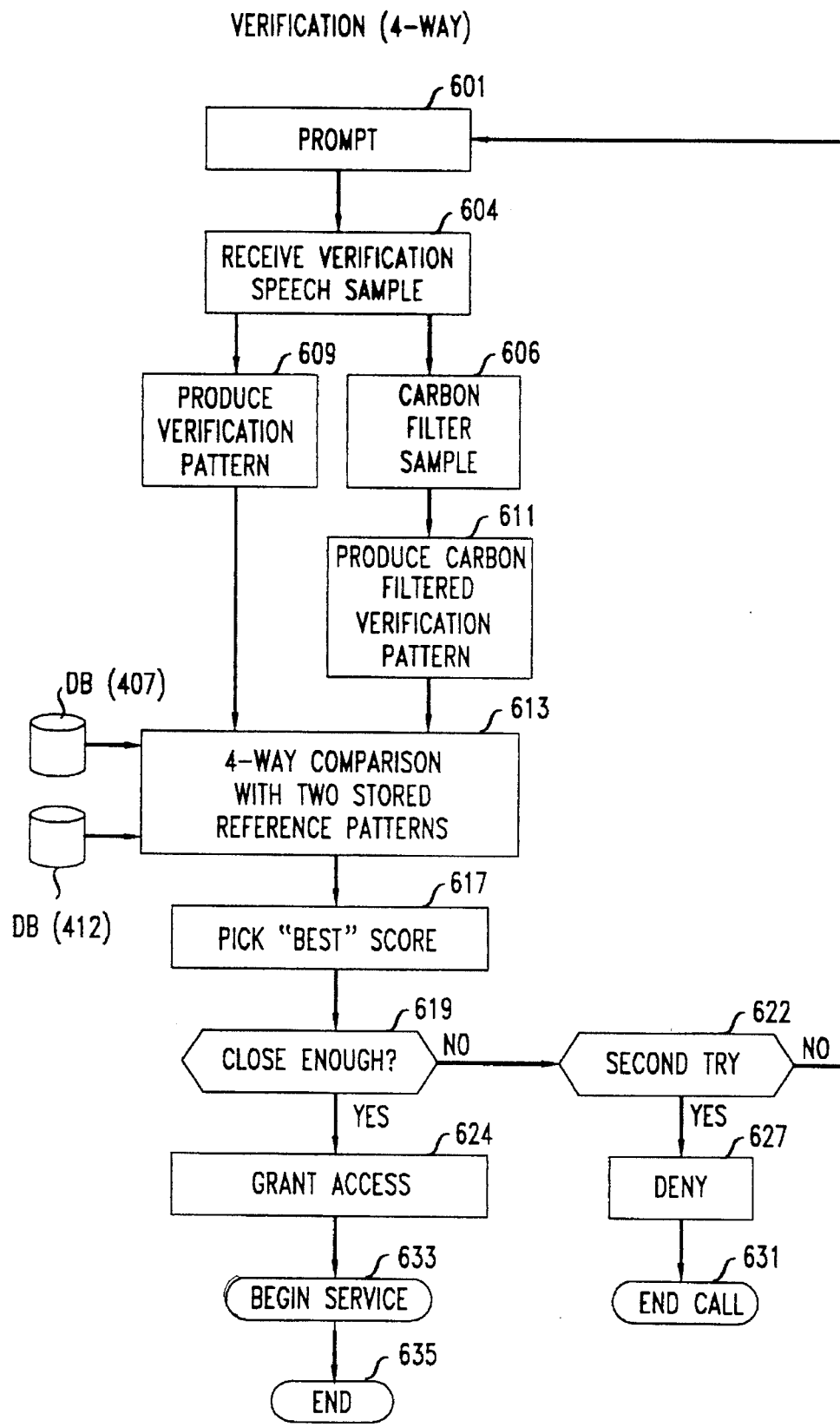
FIG. 6 illustrates a flow chart depicting a method of verifying a verification speech sample using a four-way comparison in accordance with the present invention.

FIG. 6 represents the verification process which, for reasons that will become apparent, is referred to as the four-way comparison process. An unfiltered version of the verification pattern is produced in steps 601, 604 and 609 which parallels steps 401, 402 and 409, respectively, in FIG. 4. A filtered version of the verification pattern is produced in steps 601, 604, 606 and 611 which parallels steps 401, 402, 404 and 406, respectively, in FIG. 4. (Although not explicitly shown, the prompting step 601 may include prompting the caller for the above-mentioned identification number.) In step 613, a four-way comparison is performed in which each version of the verification pattern produced in steps 609 and 611 is compared to each version of the reference pattern retrieved from DB(407) and DB(412) (based on the subscriber identification number). A score for each comparison is calculated as a function of the similarity of the characteristics of the verification patterns and reference patterns using well-known techniques. The comparison having the "best" score, namely, the comparison having the highest degree of similarity, is chosen (617). Next, if it is determined that the two patterns comprising the comparison having the best score are "close enough" to one another-based on well-known speech verification methods—access to the service provided by the platform is granted (624), service begins (633) and the process ends (635).

If, on the other hand, the two patterns having the best score are not "close enough" to one another, and this is not the caller's second attempt to gain access during this call, as determined at 622, the process returns to step 601, thereby giving the caller a "second try." If it is the caller's second attempt, access is denied (627) and the platform terminates the call. As discussed above, it may be possible that the caller is, in fact, the subscriber but for some reason access was denied. Accordingly, alternate methods may be used to verify the subscriber.

The parameters of the four-comparison case are set forth in FIG. 3. Each line entry represents one of the four combinations of patterns produced from filtered and unfiltered reference samples, and filtered and unfiltered verification samples. Depending on what type of microphone was actually used in any particular case to produce the reference samples and what type of microphone was actually used in that case to produce the verification samples, a particular one of the four combinations would be expected to result in the closest match, as also shown in the third column of the FIG. Given that all four possibilities are available, there is no need to relax the matching criteria, as in the prior art, in order to ensure that legitimate access attempts will be granted notwithstanding the use of different microphone types. Presumably, one or another of the four possibilities will produce a good match.

The theory under which the four-comparison approach may be more desirable than the single-comparison approach is that in the event that one of the patterns resulted from carbon-microphone-originated samples, comparisons can be made which do not involve a double-filtered version of those samples. It also allows for a comparison between verification patterns and reference patterns that were both produced from speech samples from electret microphones, in which case filtering with a carbon-microphone characteristic should, at least in theory, not be needed or helpful. Thus, the four-comparison approach could, in theory, improve the overall system performance.

Figure 7:
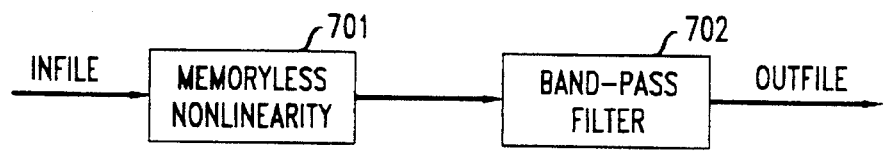
FIG. 7 illustrates a block diagram which depicts a carbon filter process in accordance with the present invention.

FIG. 7 is a conceptual view of the carbon-filter process used in the flowcharts. The speech samples are operated on by a memoryless transfer function 701. Transfer function 701 is non-linear, so that energy outside of the frequency band of interest—illustratively 300–3300 Hz—may be created. This energy is removed by a bandpass filter 702.

Figure 8:
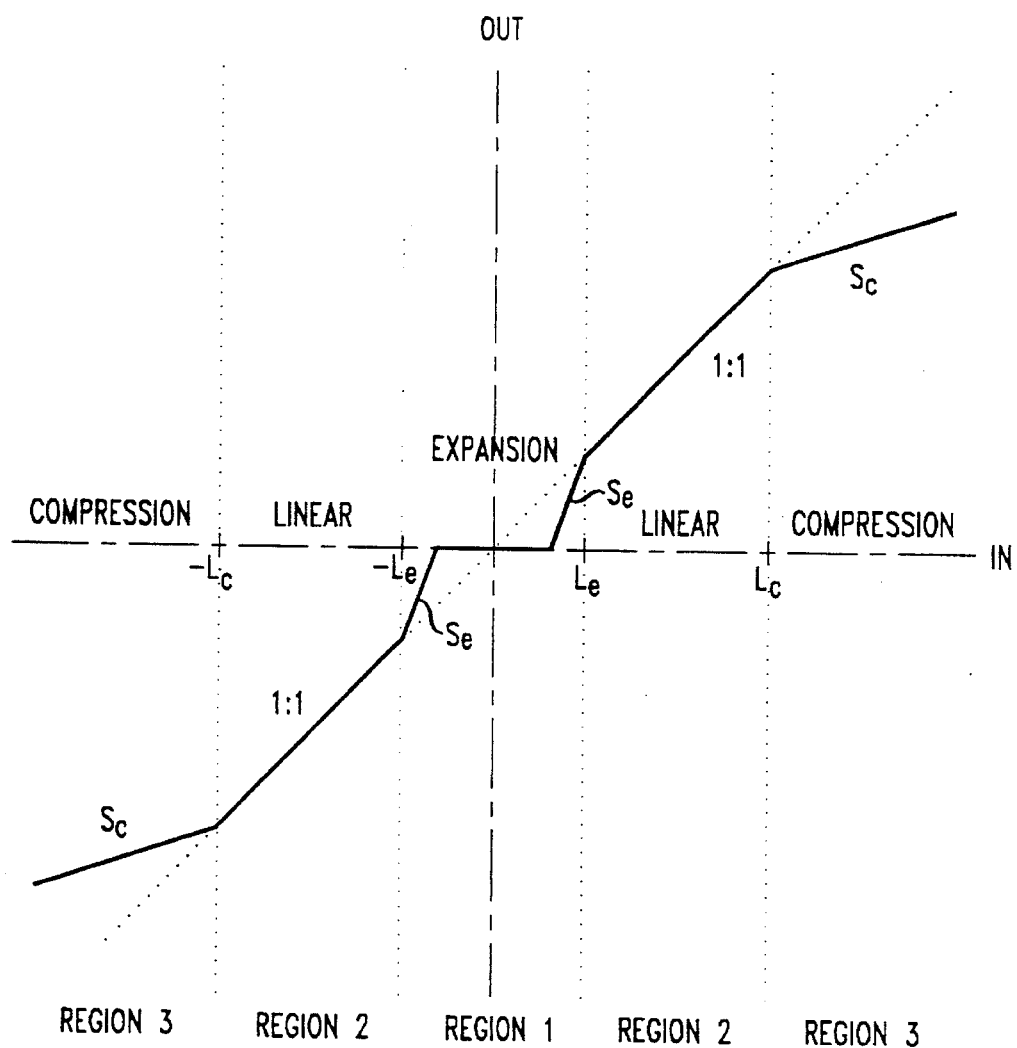
FIG. 8 illustrates a memoryless transfer function of the carbon filter of FIG. 7.

FIG. 8 shows memoryless transfer function 701. The FIG. shows, at any point in time, the value that is output as a function of the instantaneous speech sample amplitude. The transfer function has three regions: an expansion region, a linear region and a compression region. The breakpoints $L_e$ and $L_c$ and the slopes $S_e$ and $S_c$ are determined empirically. Specifically, histograms of speech sample energy levels for both carbon-microphone- and electret-microphone- produced speech are obtained, and the four transfer function parameters are selected based on those histograms in such a way that the histogram of electret-produced speech, once operated on by the transfer function, will match as nearly as possible the histogram of carbon-produced speech.

The foregoing merely illustrates the principles of the invention and it will thus be appreciated that those skilled in the art will be able to devise numerous alternative arrangements which, although not explicitly described herein, embody the principles of the invention and are within its scope and spirit.

We claim:

1. A method of processing speech samples for use in verifying a speaker, the method comprising the steps of:

receiving speech samples generated by different types of microphones;

filtering at least one of said speech samples generated by one of the microphone types with the characteristics of another one of the microphone types, wherein the characteristics of said another one of the microphone types are non-linear; and producing patterns from said filtered speech samples that can be used to verify the speaker.

2. The method according to claim 1 wherein said speech samples include reference speech samples.

3. The method according to claim 1 wherein said speech samples include verification speech samples.

4. The method according to claim 1 wherein said another one of the microphone types is a carbon microphone.

5. The method according to claim 1 wherein the characteristics of said one microphone type are linear.

6. The method according to claim 5 wherein said microphone is an electret microphone.

7. A method of verifying a speaker, the method comprising the steps of:

receiving a speech sample provided for verification from one type of microphone;

filtering the verification speech sample with the characteristics of another microphone type, wherein the characteristics of said another microphone type are non-linear;

producing a verification pattern from the filtered verification speech sample;

comparing the verification pattern to a generated reference pattern produced from a reference speech sample provided during a registration session; and verifying the identity of the speaker as a function of the reference pattern and verification pattern.

8. The method according to claim 7 wherein said generated reference pattern is produced by filtering the reference speech sample with the characteristics of said another microphone type.

9. The method according to claim 7 wherein said generated reference pattern comprises a filtered reference pattern produced by filtering the reference speech sample with the characteristics of said another microphone type, the method further comprising the steps of:

producing an unfiltered verification pattern from a verification speech sample which has not been filtered;

producing an unfiltered reference pattern from a reference speech sample which has not been filtered; and comparing each verification pattern with each reference pattern.

10. The method according to claim 9 wherein said determining step further comprises the steps of:

calculating a score representing the similarity of the verification pattern and the reference pattern for each comparison;

determining which comparison has the best score based on predetermined criteria.

11. A method according to claim 7 wherein said another microphone type is a carbon microphone.

\* \* \* \* \*